Figure 1:
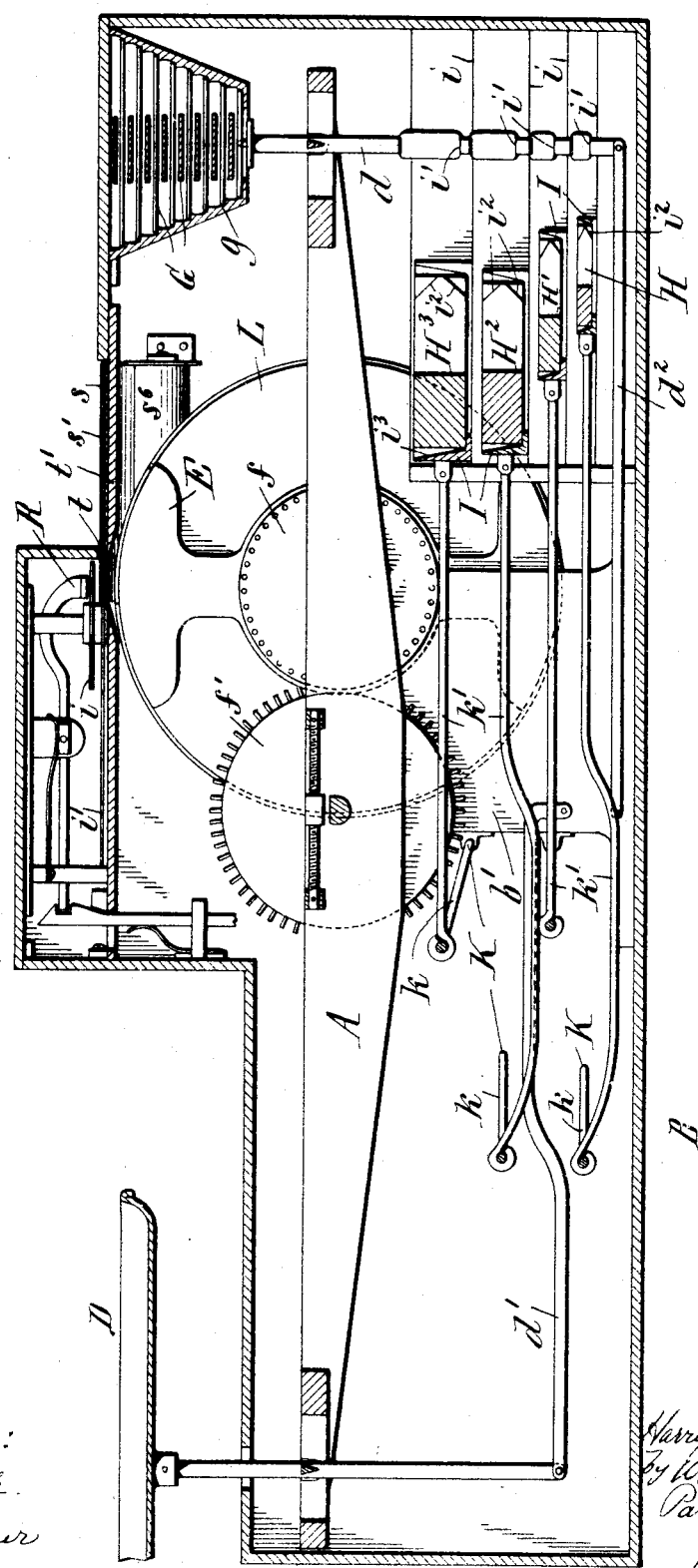

No. 792,201. PATENTED JUNE 13, 1905.
H. CUMMER.
RECORDING SCALE.
APPLICATION FILED JUNE 11, 1904.

3 SHEETS—SHEET 1.

Witnesses:
E. A. Volk.
R. W. Penner

Inventor.
Harry Cummer,
By Wilhelm
Parker & Hard
Attorneys.

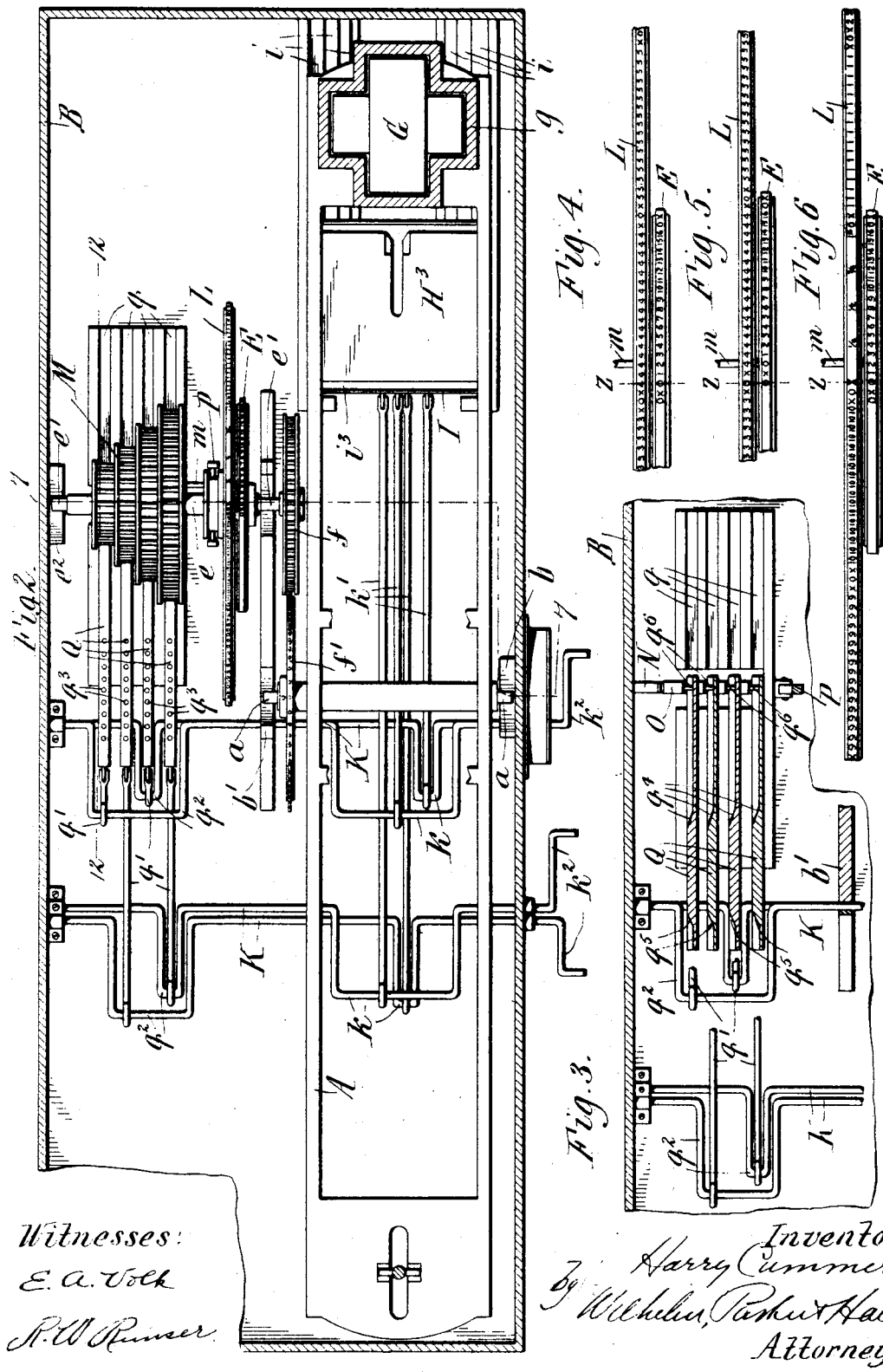

No. 792,201. PATENTED JUNE 13, 1905.
H. CUMMER.
RECORDING SCALE.
APPLICATION FILED JUNE 11, 1904.
3 SHEETS—SHEET 3.
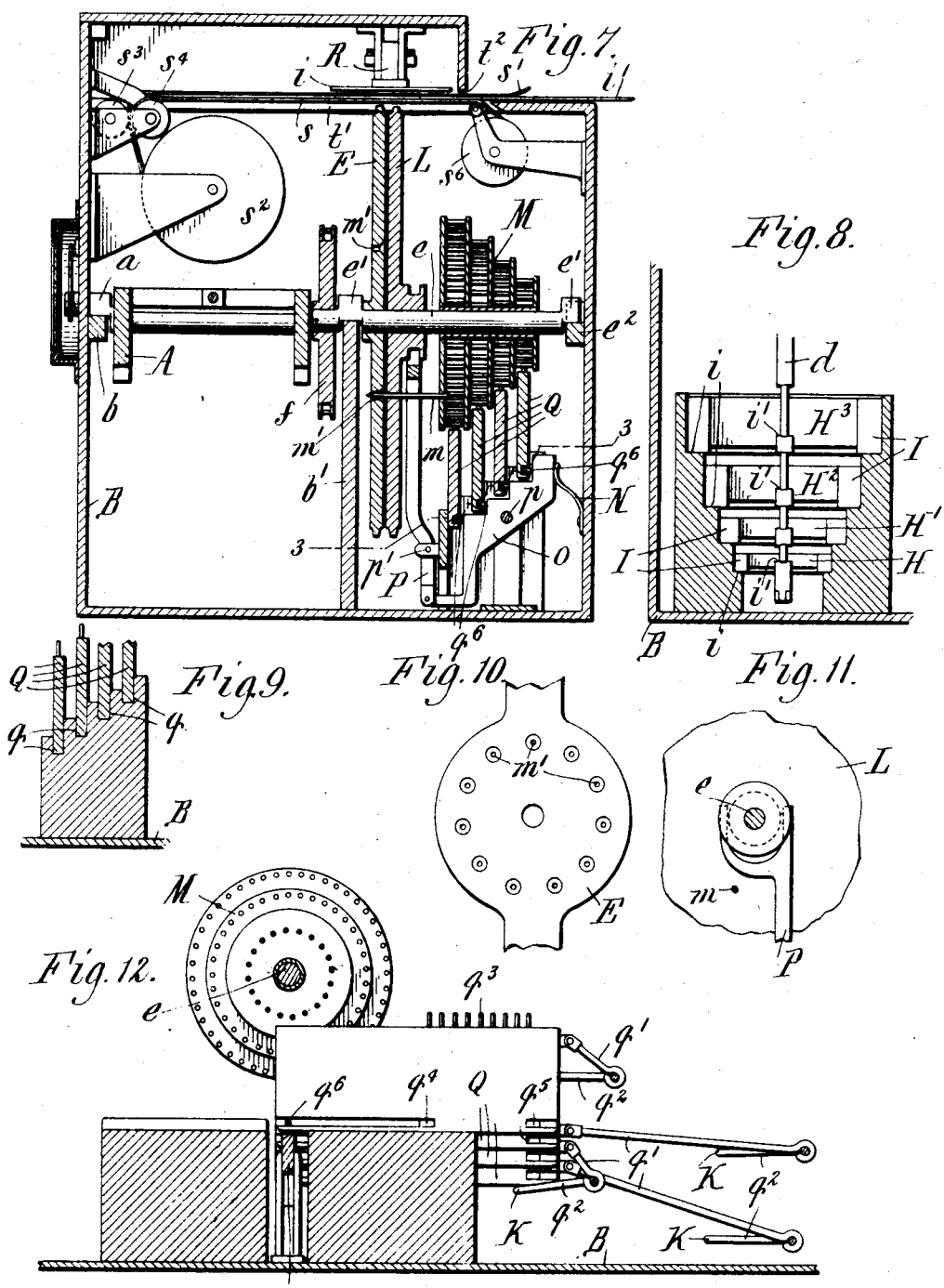

No. 792,201.                                                    Patented June 13, 1905.

UNITED STATES PATENT OFFICE.

HARRY CUMMER, OF BUFFALO, NEW YORK.

RECORDING-SCALE.

SPECIFICATION forming part of Letters Patent No. 792,201, dated June 13, 1905.

Application filed June 11, 1904. Serial No. 212,094.

*To all whom it may concern:*

Be it known that I, HARRY CUMMER, a citizen of the United States, residing at Buffalo, in the county of Erie and State of New York, have invented new and useful Improvements in Recording-Scales, of which the following is a specification.

This invention relates to recording-scales or weighing devices of that kind in which mechanism is employed for indicating or making a record of the exact weights of articles weighed on the scales.

Briefly stated, the recording-scales, hereinafter described in detail, comprise a weighing beam or balance, a series of pound or unit weights, with means for placing the same on the weight-holder of the scale-beam, a registering-wheel which is connected to oscillate with the beam and is shifted by the act of placing a unit weight or weights on the beam so that characters on said wheel indicating the value of the weights placed on the beam are moved into recording position, ounce-weights or weights indicating fractions of the pound or units represented by the other weights and which are successively picked up by the beam in its movement until the material placed on the scale to be weighed is balanced, and a registering-wheel which is moved with the beam through varying arcs dependent on the number of ounce or fractions weights picked up to bring into recording position the character representing the weight value of such ounce or fractions weights, and means for making a record from said wheels of the weight of material placed on the scale.

The invention is hereinafter described as applied to counter-scales, but is applicable to platform-scales and other types of scales.

The object of the invention is to provide a desirable registering or recording scale of simple and practical construction which will accurately register or record the weights of the articles or materials weighed on the scales.

In the accompanying drawings, consisting of three sheets, Figure 1 is a fragmentary longitudinal sectional elevation of a recording-scale embodying the invention. Fig. 2 is a fragmentary horizontal sectional elevation thereof. Fig. 3 is a fragmentary horizontal sectional plan in line 3 3, Fig. 7. Figs. 4, 5, and 6 are diagrammatic views showing different relative positions of the fractions and units registering wheels. Fig. 7 is a transverse sectional elevation of the machine in line 7 7, Fig. 2. Fig. 8 is a transverse section of the stepped guide for the units-weight carriers. Fig. 9 is a fragmentary section of the rack-bars for shifting the units-registering wheel and their guides. Fig. 10 is a side elevation of the hub of the fractions-registering wheel. Fig. 11 is a detail sectional elevation of the hub of the units-registering wheel and its shifting-lever. Fig. 12 is a sectional elevation of the operating-gear and racks for the units-registering wheel in line 12 12, Fig. 2.

Like letters of reference refer to like parts in the several figures.

A represents a scale-beam which is fulcrumed, preferably by knife-edges $a$, on suitable supports $b\ b'$, preferably secured to a casing or box B, which is employed for inclosing and protecting the parts of the scale. The beam carries at one end a pan D and at the opposite end a suspended weight-holder $d$, on which the pound or units weights are placed to balance the material placed in the pan.

$d'\ d^2$ represent the usual parallel links connected to the pan-supporting rod and weight-holder for maintaining these parts in upright position.

While a counter-scale with a weighing-pan is shown and described, the invention is also applicable to platform-scales, in which case the beam would be connected to the scale-platform.

E represents a wheel for registering the ounces or fractions of the pounds or other units of weight, large or small, for which the scale is intended. The wheel is connected to the scale-beam to swing therewith and is provided, preferably on its periphery, with indicating characters or type, preferably arranged as shown in Figs. 4, 5, and 6, from which it will be seen that the wheel bears numbers or digits from "0" to "16," indicating the ounces or fractions of a pound, and in addition thereto a cipher and an "X" or other arbitrary characters at opposite ends of the row of numbers. These numbers will be varied to indicate desired fractional parts of the unit of weights for which the scale is intended. In the construction shown the wheel E, which will be hereinafter called the "fractions-registering" wheel for the sake of clearness, is fixed on a shaft $e$, which preferably has knife-edge journals $e'$ bearing on suitable supports, such as the support $b'$ for the scale-beam, and a block $e^2$, Fig. 7, fixed to the inclosing casing, and has fixed thereto a gear-pinion $f$, which meshes with a gear $f'$, fixed to the fulcrum-shaft of the scale-beam, so that when the beam rocks the fractions-registering wheel will be oscillated. The gears are employed to obtain a greater movement of the fractions-wheel than would be secured by connecting it directly to the beam, thereby enabling the registering characters to be spaced sufficiently far apart to prevent crowding.

G represents a series of separate ounce or fractions weights supported independently of the weight-beam adjacent to and preferably above the projecting upper end of the suspended weight-holder. These ounce-weights are stacked or superposed in a stationary stepped support $g$, which is secured to the inclosing case or other stationary part of the machine. Each weight weighs one ounce; but they increase in length in an ascending series, and each one rests at its opposite ends on steps at the opposite sides of said support and is supported independently of and spaced from the adjoining weights. They are preferably of the rectangular shape shown in Fig. 2, and the alternate weights are arranged in one direction, while the remainder extend crosswise thereof. When material to be weighed is placed in the scale-pan, the latter descends with the end of the beam to which it is attached, and the opposite end of the beam is raised so that the upper end of the weight-holder lifts successive ounce-weights until the equivalent in weight of the material in the pan is lifted, when the beam will balance and come to rest. The ounce-wheel turns with the beam, and when the latter balances the character thereon indicating the number of ounce-weights lifted and likewise the weight of the material in the pan will be in recording position, which in the machine illustrated is at the highest point of the wheel.

H H' H² H³, Fig. 1, represent pound or units weights to be placed on the suspended weight-holder of the beam. They are of different sizes and weights. For instance, they weigh, respectively, one, two, three, and four pounds or other amounts, according to the scale with which they are employed, and they are adapted to be placed on the suspended weight-holder separately or in any desired combination, depending on the desired weight of the material to be weighed in the pan. These weights, which are hereinafter termed the "units-weights," are slotted vertically and are held in slide-carriers I, which are supported to slide toward and from the weight-holder on stationary stepped guides or ways $i$ of any suitable construction. The weight-holder is provided with supporting-shoulders $i'$ for each weight, and each weight has at the front end of its slot inclined faces $i^2$, Fig. 1, which when the weight is slid onto the weight-holder strike the supporting-shoulders of the latter and lower the weight-holder and adjacent end of the beam a predetermined distance, thereby elevating the scale-pan. After a weight has been thus placed on the weight-holder and a corresponding weight of material placed in the scale-pan the latter will lower and raise the weight-holder, with the attached weight, until the beam balances. The opening of each weight-carrier is sufficiently larger than the weight next below it to permit the upward movement therethrough of the weight on the weight-holder. The inner faces of the sides of each weight-carrier are preferably beveled, as indicated at $i^3$, Fig. 1, to properly center the weight in its carrier when the material is removed from the pan and the weight-holder and weight descend. The weight-carriers are moved to place the weights on and remove them from the weight-holder by suitable means—such as rock-shafts K, Figs. 1 and 2—which are journaled in bearings in the front and back of the inclosing casing and each having a crank $k$ thereon connected by a link $k'$ to one of the weight-carriers. Each rock-shaft has a handle or crank $k^2$ at its front end for turning it. When a rock-shaft is turned a half-revolution, the weight-carrier to which it is attached is slid forward and its weight engaged on the weight-holder.

L represents a wheel which registers the pounds or units for which the scale is adjusted and which will be hereinafter called the "units-registering wheel." This wheel is located beside the fractions-registering wheel and is provided on its periphery with units registering or recording characters arranged in sections or sets, as hereinafter described.

When a units weight or weights is or are placed on the weight-holder $d$, the units-registering wheel is turned to bring into recording position the character representing the weight value of the weight or weights on the weight-holder by the following mechanism: The units-registering wheel is loosely mounted to turn and slide on the shaft of the fractions-wheel between the latter wheel and a gear-wheel M, which is also loosely journaled on said shaft and is provided with a pin $m$, which projects to opposite sides thereof and slidably engages in a hole in the gear-wheel M and in the normal position of the units-wheel, shown in the drawings, enters one of a series of holes $m'$ in the fractions-wheel, thus coupling all of said wheels together. The fractions-registering wheel has a hole $m'$ for each section of the units-registering wheel. (See Fig. 10.) When the units-registering wheel is moved away from the fractions-registering wheel, its pin is retracted from the hole in the latter and the units-registering wheel can be turned with the gear-wheel M independently of the fractions-registering wheel. The holes $m'$ preferably have conical or flaring ends to facilitate the proper engagement of the coupling-pin therewith. The pound-wheel is normally pressed toward the ounce-wheel by a suitable spring N, Fig. 7, which in the construction shown is secured to the back of the inclosing casing and bears against one end of a lever O, which is fulcrumed at $p$ and is connected to one end of a lever P, fulcrumed at $p'$ and having a forked end provided with pins or the like entering a groove in the hub of the units-registering wheel.

Q, Figs. 2, 7, 9, and 12, represents a series of sliding rack-bars which are arranged side by side to slide in suitable guides or ways $q$, each rack being connected by a link $q'$ to a crank $q^2$ on one of the operating rock-shafts K for the units-weight carriers L. Each of the rack-bars has teeth $q^3$ to mesh with teeth on the gear-wheel M for turning the latter and is also provided at one side at opposite ends of its row of teeth with oppositely-inclined faces $q^4 q^5$, Fig. 3, which coöperate with pins or parts $q^6$ on the lever O to move the latter and shift the units-registering wheel away from and toward the fractions-registering wheel. When one of the rock-shafts is operated to move its weight-carrier to place a weight on the weight-holder, the rack connected to said shaft is moved lengthwise, and its inclined face $q^4$ engages the coöperating pin or part $q^6$ on the lever O and shifts the latter and the units-registering wheel away from the ounce-wheel, thereby uncoupling said wheels. The teeth of the rack then mesh with the coöperating teeth of the gear-wheel M and turn the latter and the pound-wheel coupled thereto and then move out of mesh with the teeth of the gear-wheel. The other inclined face $q^5$ is then brought opposite to its pin or part on the lever O, permitting the spring N to force said lever over to again couple the units-wheel with the fractions-wheel. Each rack turns the units-wheel a different portion of a revolution to bring the proper character into registering or recording position. This may be effected by the means shown, comprising the cone gear-wheel M and the several rack-bars provided with a like number of teeth, or the same result may be secured by any other suitable means. After the units-registering wheel has been thus shifted and coupled with the fractions-registering wheel it will oscillate with the latter and the scale-beam. The relation of the inclined faces $q^4$ on the rack-bars Q and the inclined faces $i^2$ on the units-weights is such that the latter faces engage and lower the weight-holder and hold the beam from movement when the units-registering wheel is disconnected from the fractions-wheel, thereby preventing any relative rotary movement between the units-wheel and scale-beam except that effected by the rack-bars and gear-wheel M. Mechanism of various other constructions could be devised for thus shifting the units-registering wheel by the placing of the weights on the weight-holder.

The periphery of the units-wheel is divided into a number of sections, one greater than the entire number of pounds. For instance, in the scale shown, which is intended to weigh ten pounds, the units-wheel is divided into eleven sections. One of these sections may be left blank, or it may be provided with numbers, such as "$\frac{1}{4}, \frac{1}{2}, \frac{3}{4}$," indicating fractions of a pound or unit of weight, (see Fig. 6,) and the other sections are provided with numbers representing successive pounds or units of weight. Each section (see Figs. 4, 5, and 6) bears a series of numbers of the same denomination—one for each fraction, digit, or number, or the fractions-wheel—and in addition thereto at the left end of the section a cipher and an arbitrary character, such as "x," on opposite sides of the cipher. When the scale-beam is horizontal or balanced and before the weights have been placed on the holder and the material in the pan, the two registering-wheels occupy the relation shown in Fig. 6, with the second cipher of the fractions-registering wheel and the second "x" of the units-registering wheel at the recording-point Z. If now material is placed in the pan, the beam will rock, and the wheels will turn together until as many of the fractions-weights G are lifted by the beam as are necessary to balance the weight of material in the pan, when the beam and registering-wheels will come to rest with the number on the fractions-wheel representing the combined weight of the ounce or fractions weights lifted in recording position at the highest point of the wheel. If the material weighs more than one pound or unit, this will be indicated by the ciphers or "x's" of the two wheels, which will be thus moved to recording position. When the material is removed from the pan, the beam and the registering-wheels return to the initial or balance position. When one or more pounds of material are to be weighed—say, for example, four pounds—the four-pound weight $H^3$ is placed on the weight-holder by turning the rock-shaft K, connected to its weight-carrier, and the inclined faces $i^2$ on the weight will engage the shoulders of the weight-holder and lower the same and tilt the beam, as before explained. The actuation of the rock-shaft also uncouples the units-registering wheel from the fractions-registering wheel, turns the former relative to the latter, and again couples the two wheels by the rack-and-gear mechanism described. The registering-wheels will then bear the relation indicated in Fig. 5 with the "0" preceding the first "4" of the units-wheel and the first "0" of the fractions-wheel at the recording-point. The material to be weighed is then placed in the pan, and if it weighs exactly four pounds the pan will descend until the beam balances, at which time the registering-wheels will bear the relation shown in Fig. 4, with the first "4" of the units-wheel and the second "0" of the fractions-wheel in recording position, thus showing that four pounds and no ounces or exactly four pounds has been weighed. If four pounds in weight is not placed in the pan, the beam will not return to the balancing position, and the "x x" or "O O" of the two wheels would stand at the recording-point indicating light weight. If, on the other hand, more than four pounds in weight be placed in the pan, the latter will continue to descend until the overweight of the material is balanced by the ounce or fractions weights picked up by the beam, when the latter will come to rest with one of the "4's" of the units-registering wheel and that number on the fractions-registering wheel which indicates the number of ounce or fractions weights picked up in recording position, thereby showing the exact weight in pounds and ounces of the material placed in the pan. It will be understood that the registering-wheels oscillate with the beam, both when weighing only the ounces or fractions and also after the units-wheel has been shifted by placing a weight on the weight-holder, and they register not simply the weight value of the weights placed on the weight-holder, but the exact weight of the material in the pan, determined by the balancing of the beam, whether under or over weight. The scale could thus be used to indicate to the seller and purchaser the exact weight of the material placed in the pan by exposing the characters at the recording-point; but preferably an impression or record of the weight is taken from the numbers of the registering-wheels at the recording-point by suitable mechanism. For this purpose in the scale illustrated a hammer R is arranged opposite to the registering-wheels at the recording-point with carbon-sheets, inked ribbons, or the like $i$ $i'$ interposed between the hammer and registering-wheels and webs of paper or the like $s$ $s'$, respectively, between the carbon-sheets and between the inner carbon-sheet and the registering-wheels. The two webs are wound on and drawn from a supply-roll $s^2$ and pass between suitable feed-rollers $s^3$ $s^4$, one of said webs, $s$, which is intended for a permanent record, being wound upon a receiving spring-roller $s^6$. The webs and carbon-sheet between them extend out through a slot $t$, Fig. 1, in the upper portion of the inclosing casing over a part $t'$ of the casing, so that the names of the articles weighed can be written on the webs opposite to the points at which the records of the weights are made. The upper web can be pulled out through a slot $t^2$, Fig. 7, in the inclosing casing and detached for the purchaser.

The impression-hammer and web-feed rollers are operated by suitable mechanism which is not herein shown and described, as an understanding of the same is not necessary to a comprehension of the invention herein claimed.

Any suitable recording mechanism may be employed.

I claim as my invention—

1. The combination of a scale-beam, a series of weights, a part connected with said beam and which successively lifts said weights automatically by the movement of the beam, a weight which is placed on said beam, and a device operatively connected with said weight and which is set by the placing of the weight on the beam and moves with the beam for indicating the weight value both of the weight placed on the beam and of the weights automatically lifted by the beam, substantially as set forth.

2. The combination of a scale-beam, a series of weights, a part connected with said beam and which successively lifts said weights automatically by the movement of the beam, a weight which is placed on said beam, a device operatively connected with said weight and which is set by the placing of the weight on the beam and moves with the beam for indicating the weight value both of the weight placed on the beam and of the weights automatically lifted by the beam, and means for making a record from said indicating means, substantially as set forth.

3. The combination of a scale-beam, a weight, means for placing said weight on the scale-beam, a series of weights, a part connected with the beam and which successively lifts said weights automatically by the movement of the beam, a weight-indicating device which is shifted by the weight-placing means and which is also movable with the scale-beam, whereby the weight value of both the weight placed on the beam and the weights automatically lifted thereby is indicated, substantially as set forth.

4. The combination of a scale-beam, a weight, means for placing the weight on the scale-beam, a weight-indicating device and connections whereby the indicating device is shifted by the actuation of the weight-placing means, said weight-indicating device being connected to move with the beam after being shifted and having characters to indicate the exact weight of the material being weighed, substantially as set forth.

5. The combination of a scale-beam, a weight-holder connected therewith, a series of weights, means for moving one or more of said weights onto said holder, and a single device connected to and operated by said means to indicate the weight value of all of the weights which are placed on said weight-holder, substantially as set forth.

6. The combination of a scale-beam, a weight-holder connected therewith, a series of weights, movable carriers for said weights, means for moving said carriers to place one or more of said weights on the weight-holder, and a single device connected to and operated by said means to indicate the weight value of all of the weights which are placed on the weight-holder, substantially as set forth.

7. The combination of a scale-beam, a weight-holder connected therewith, a weight, a movable carrier for said weight, means for moving said carrier to place said weight on said weight-holder, a wheel operatively connected to said weight-carrier and which is provided with characters which are moved by the actuation of said weight-carrier to a position to indicate the weight value of the weight which is placed on said weight-holder, substantially as set forth.

8. The combination of a scale-beam, a weight-holder connected therewith, a series of weights, means for moving one or more of said weights onto the weight-holder, said weights and weight-holder having parts which coöperate to tilt the beam when the weights are placed on the holder, and a single device operatively connected with the weight-moving means which indicates the weight value of all of the weights placed on the weight-holder, substantially as set forth.

9. The combination of a scale-beam, a weight-holder connected therewith, a series of weights, means for moving one or more of said weights onto the weight-holder, said weights having inclined faces which engage a portion of the weight-holder to tilt the beam when the weights are placed on the holder, and a single device operatively connected with the weight-moving means which indicates the weight value of all of the weights placed on the weight-holder, substantially as set forth.

10. The combination of a scale-beam, a weight-holder connected therewith, a weight, a movable weight-carrier which supports said weight, means for moving said carrier to place the weight on the holder, coöperating parts on the weight and weight-holder for tilting the beam when the weight is placed on the holder, and means for indicating the weight value of the weight placed on the holder, substantially as set forth.

11. The combination of a scale-beam, a weight-holder connected therewith, a weight, a movable weight-carrier for placing the weight on the weight-holder, said weight-carrier having portions to center the weight therein when it is returned to the weight-carrier after being lifted from the same, substantially as set forth.

12. The combination of a scale-beam, a registering device connected to said scale-beam to move therewith, a weight, means for moving said weight onto said weight-holder, and mechanism operatively connected with said means for shifting said registering device relative to said beam, substantially as set forth.

13. The combination of a scale-beam, a weight-holder connected therewith, an indicating device connected to move with said beam, a weight, means for moving said weight onto said weight-holder, a registering device, and connections between said registering device and said means for shifting the former relative to said indicating device when said weight is placed on the weight-holder, substantially as set forth.

14. The combination of a scale-beam, a weight-holder connected therewith, an indicating device connected to move with said beam, a weight, a weight-carrier for said weight, means for moving said weight-carrier to place said weight on said weight-holder, a registering device, and connections between said registering device and said weight-carrier for shifting the former relative to said indicating device when said weight is placed on the weight-holder, substantially as set forth.

15. The combination of a scale-beam, a weight, means for connecting said weight with said beam, a registering-wheel connected to move with said beam, and a second registering-wheel releasably connected with said first registering-wheel and operatively connected with the weight whereby said second registering-wheel is shifted relative to the first registering-wheel when said weight is connected with the beam, substantially as set forth.

16. The combination of a scale-beam, a weight-holder, connected therewith, a weight, a carrier for said weight, means for moving said weight-carrier to place said weight on the weight-holder, a fractions-registering wheel movable with said beam, a units-registering wheel which is releasably coupled to said fractions-wheel, and mechanism connected with said weight-carrier for shifting said units-wheel relative to said fractions-wheel, substantially as set forth.

17. The combination of a scale-beam, a weight, means for connecting said weight with said beam, a registering-wheel connected to move with said beam, a second registering-wheel releasably connected with said first registering-wheel and operatively connected with the weight whereby said second registering-wheel is shifted relative to the first registering-wheel when said weight is connected with the beam, and means for making a record from said registering-wheels, substantially as set forth.

18. The combination of a scale-beam, a weight-holder connected therewith, a series of weights superposed adjacent to said beam and which are lifted successively by the movement of the beam, a registering device connected to move with the beam and which indicates the weight value of the weights lifted by the beam, a weight, means for placing the same on the weight-holder, and a second registering device which is operatively connected to said weight and is actuated to indicate the weight value of said weight when the latter is placed on the weight-holder, substantially as set forth.

19. The combination of a scale-beam, a weight-holder connected therewith, a weight, a carrier for said weight, means for moving said carrier to place the weight on the holder, a registering-wheel releasably connected to said beam, a gear-wheel connected to said registering-wheel, a toothed rack connected to said weight-carrier for turning said gear-wheel, and means actuated by said rack to disconnect and connect said registering-wheel from and to said beam, substantially as set forth.

20. The combination of a scale-beam, a weight-holder connected therewith, a series of weights, carriers for said weights, means for independently moving said carriers to place said weights on the weight-holder, a registering-wheel releasably connected to said beam, a gear-wheel connected to said registering-wheel, toothed racks each connected to one of said weight-carriers and meshing with said gear-wheel, and means actuated by each of said racks to disconnect and connect said registering-wheel from and to the beam, substantially as set forth.

21. The combination of a scale-beam, means for resisting the movement of the beam by the material being weighed, a registering device movable with the beam to indicate the weight value of said resistance, a weight, means for connecting the same with the beam, a second registering device also movable with the beam, and connections between said second registering device and said means for connecting the weight with the beam, whereby the former is shifted to register the weight value of the weight connected with the beam, substantially as set forth.

22. The combination of a scale-beam provided with a weight-holder, a weight, means for placing said weight on the weight-holder, a registering device releasably connected with the beam, mechanism operated by said weight-placing means for shifting said registering device, and means for holding the beam from movement while the registering device is disconnected therefrom, substantially as set forth.

Witness my hand this 9th day of June, 1904.

HARRY CUMMER.

Witnesses:
   CHAS. W. PARKER,
   C. M. BENTLEY.